THRESHOLD CIRCUIT FOR COMPARING VARIABLE AMPLITUDE VOLTAGES

Filed Oct. 18, 1967 4 Sheets-Sheet 1

JAMES R. TALLEY
INVENTOR

BY John E. Vandigriff
ATTORNEY

United States Patent Office 3,546,481
Patented Dec. 8, 1970

3,546,481

THRESHOLD CIRCUIT FOR COMPARING VARIABLE AMPLITUDE VOLTAGES

James R. Talley, Richardson, Tex., assignor to Texas Instruments Incorporated, Dallas, Tex., a corporation of Delaware Filed Oct. 18, 1967, Ser. No. 676,334
Int. Cl. H03k *5/20*
U.S. Cl. 307—235 5 Claims

ABSTRACT OF THE DISCLOSURE

Disclosed is a low level comparison circuit which may be used in computer systems or in any application where accurate comparison of low level signals is required, the circuit having stable operation over a wide temperature range and a wide range of power supply levels.

With increasing use of large memory designs there has been an increasing need for sensing techniques that will improve system performance while reducing the cost of sensing circuitry. One of the primary design considerations is noise in the system. Large core planes may be sectored into small sub-planes resulting in more than one sense line per bit. By sectoring the plane and selecting the best combination of sense and drive paths, the signal-to-noise ratio form each core is markedly improved. It is desirable to use a sensing technique that does not require a separate low level comparison or sense amplifier for each sense line, since only one sense line will be retrieving information from the cores from each bit in the memory word.

A technique often used in conventional low level comparison amplifier design involves the use of separate sense pre-amplifiers for each sense line. The outputs of the pre-amplifiers are applied to a common detector and output circuit for each plane. The extensive use of reactive components such as inductors and capacitors in conventional designs is an economic decision. The cost of extra transistors or resistors in a monolithic integrated circuit design is relatively small. These extra components will have inherently good matching and tracking characteristics with other devices in the integrated circuit. This is not so in discrete designs. However, the use of these components in sense-amplifier designs is invariably accompanied by undesirable effects such as long recovery time to over-load signals and a shift in threshold levels with changes in input repetition rates.

The present invention is characterized by a low level comparison circuit which is of an integrated sense-amplifier design and is intended to alleviate the problems associated with previous sense-amplifier designs. In the context of the present application, a sense amplifier is a low-level comparison amplifier which compares signals generally in the millivoltage range and in one specific example illustrated herein, devices refer to voltage in the range of about 10 to 100 millivolts. A feature of the circuit is the use of multi-differential pre-amplifier direct-coupled design, thereby eliminating the problems associated with the use of reactive components. Other features of the amplifier are externally-adjustable input threshold levels featuring a negligible drift with temperature, a minimum change in the threshold level with variation in power supply and compatibility with standard transistor-transistor logic (TTL) circuitry.

It is, therefore, one object of the invention to provide a stable threshold circuit which may be used in conjunction with computer memory cores which has a stable operation over a wide temperature range and a wide range of power supply levels. It is a feature of the invention that the threshold circuit may have one or more inputs and that the circuit is so arranged so that it does not require a separate sense amplifier for each sense line, since only one sense line will be retrieving information from the memory cores for each bit in the memory word.

Other objects and features of the invention will become apparent to those skilled in the art from the following detailed description and accompanying drawings wherein.

Figure 1:
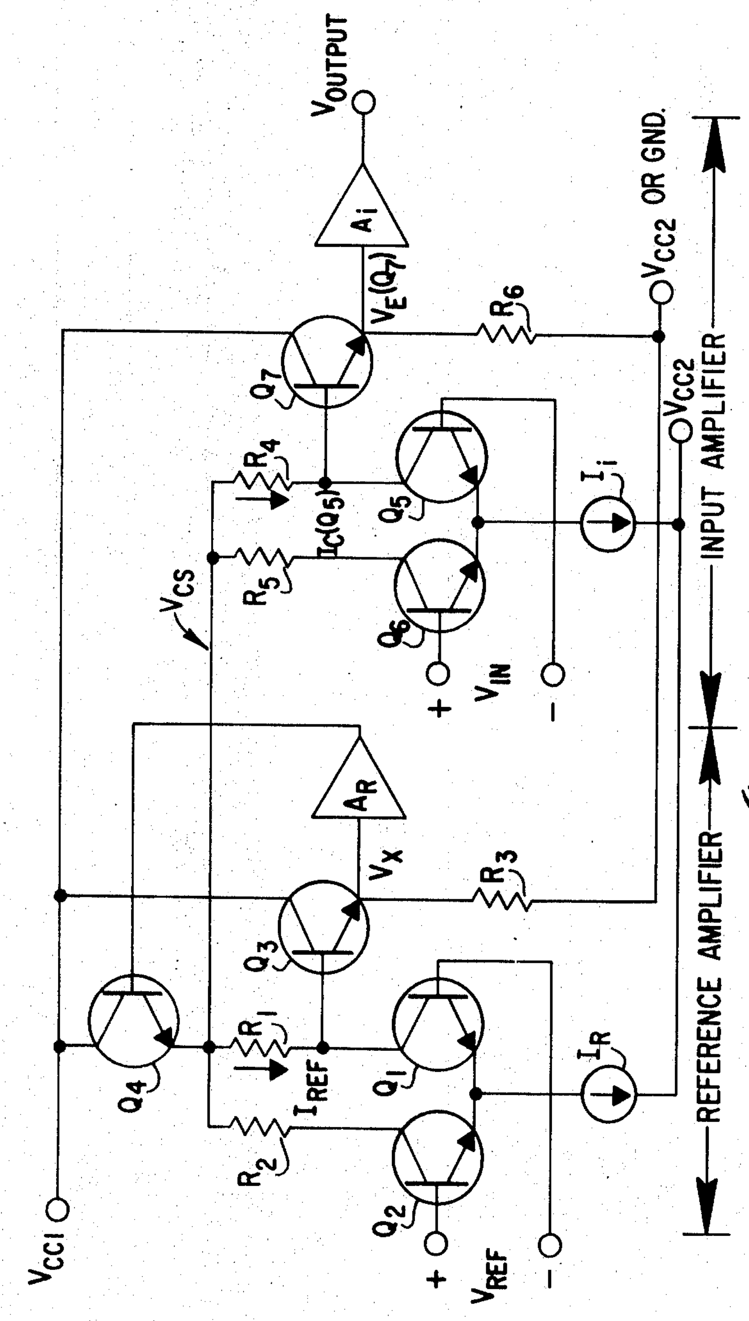
FIG. 1 is a circuit diagram of a basic low-level threshold circuit.
Figure 2:
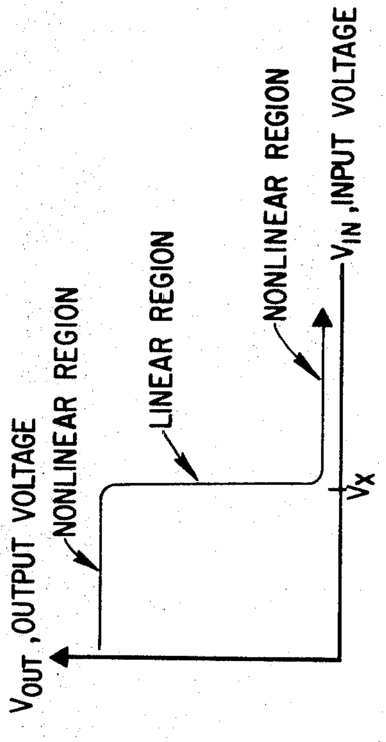
FIG. 2 is a plot of an inverting amplifier voltage transfer function.

Referring now to the drawings, there is shown in FIG. 1 a reference amplifier which may be used to establish a collector supply voltage. The input amplifier collector supply voltage, $V_{cs}$, is controlled by the reference input voltage, $V_{REF}$. The complete reference amplifier is composed of transistors $Q_1$, $Q_2$, $Q_3$ and $Q_4$, resistors $R_1$, $R_2$ and $R_3$, a current source $I_R$ and inverting amplifier $A_R$. The inverting amplifier may also be composed of additional transistors and resistors. The restriction on the inverting amplifier is that it be direct-coupled and exhibit a relatively large D.C. gain. The voltage transfer function (output voltage vs. input voltage) of the inverting amplifier is shown in FIG. 2.

The inverting amplifier has a feedback loop around it composed of transistors $Q_3$ and $Q_4$ and resistor $R_1$. The range of the reference input voltage $V_{REF}$ is such that the inverting amplifier is always in its linear range. Assuming that the voltage at the input to the inverting amplifier is $V_x$, the collector supply voltage, $V_{cs}$, is:

$$V_{cs}=V_x+I_{REF}R_1+V_{BE}(Q_3)$$

Equation (1)

where $I_{REF}$ is the current through resistor $R_1$ and $V_{BE}(Q_3)$ is the base-emitter voltage of transistor $Q_3$.

The current, $I_{REF}$, is the current in the collector of transistor $Q_1$ of the differential pre-amplifier composed of transistors $Q_1$ and $Q_2$ and may be calculated to be:

$$I_{REF}=I_R\left[\frac{1}{\frac{V_{REF}q}{KT}}\right]_{1+e}$$

Equation (2)

where $V_{REF}$ is the reference amplifier input voltage of indicated polarity; $q$ is an electron charge; K is Boltzman constant; and T is temperature in degrees Kelvin.

For the indicated polarity of the reference input voltage, $V_{REF}$, Equations 1 and 2 may be combined:

$$V_{cs}=V_x+I_RR_1\left[\frac{1}{\frac{V_{REF}q}{KT}}\right]_{1+e}+V_{BE}(Q_3)$$

Equation (3)

The collector supply voltage $V_{cs}$ is a function of the current source $I_R$, the collector resistor $R_1$, the base-emitter volage of transistor $Q_3$, the inverting amplifier input voltage $V_x$, and the reference input voltage $V_{REF}$. At a selected temperature $I_R$, $R_1$ and $V_{BE}(Q_3)$ may be assumed to be constant. Because of the high gain of the inverting amplifier $A_R$, the value of $V_x$ may be assumed to be constant over the range of desired operation. The value of the collector supply voltage $V_{cs}$ is therefore primarily a function of the reference input voltage $V_{REF}$. Transistor $Q_4$ provides a high current driving capability for the reference amplifier. It should be noted that power supplies do not enter into Equation 3.

The collector supply voltage $V_{cs}$ is supplied to an input amplifier as shown in FIG. 1. The reference amplifier and the input amplifier are identical except the output of inverting amplifier $A_i$, in the input amplifier is not connected in a feedback configuration. A perfect matching of all parameters is assumed between similar components in the reference amplifier and in the input amplifier.

Assuming that all components are matched, the following equations may be developed:

$$I_c(Q_5)=I_i\left[\frac{1}{\frac{V_{in}q}{KT}}\right]_{1+e}$$

Equation (4)

For the indicated polarity of $V_{in}$, the voltage at the input amplifier $A_i$ is:

$$V_E(Q_7)=V_{cs}-I_c(Q_5)R_4-V_{BE}(Q_7)$$

Equation (5)

Combining Equations 4 and 5 results in:

$$V_E(Q_7)=V_{cs}-I_iR_4\left[\frac{1}{\frac{V_{in}q}{KT}}\right]_{1+e}-V_{BE}(Q_7)$$

Equation (6)

Combining Equations 3 and 6 results in:

$$V_E(Q_7)=V_x+I_RR_1\left[\frac{1}{\frac{V_{REF}q}{KT}}\right]_{1+e}+V_{BE}(Q_3)$$

$$-I_iR_4\left[\frac{1}{\frac{V_{in}q}{KT}}\right]_{1+e}-V_{BE}(Q_7)$$

Equation (7)

and since $R_1=R_4$, $I_B=I_i$, and $V_{BE}(Q_3)=V_{BE}(Q_7)$, the following equation results:

$$V_E(Q_7)=V_x+I_RR_1\left[\left(\frac{1}{\frac{V_{REF}q}{KT}}\right)_{1+e}-\left(\frac{1}{\frac{V_{in}q}{KT}}\right)_{1+e}\right]$$

Equation (8)

It should be noted that the voltage $V_E(Q_7)$ is the input voltage of inverting amplifier $A_i$, and since $A_i$ is matched to the inverting amplifier $A_R$, the voltage transfer characteristic of $A_i$ is the same of that of $A_R$ and is shown in FIG. 2. Because of the high gain of $A_i$, a small incremental change in the input voltage $V_E(Q_7)$ will switch its output $V_{out}$ from one non-linear region to the other non-linear region.

Inspection of Equation 8 shows that for the following conditions, the following results:

Condition 1. $V_{in}<V_{REF}$: $V_E(Q_7)<V_x$, $V_{out}$=High
Condition 2. $V_{in}>V_{REF}$: $V_E(Q_7)>V_x$, $V_{out}$=Low
Condition 3. $V_{in}=V_{REF}$: $V_E(Q_7)=V_x$, $V_{out}$ in Linear Range The value of the input voltage $V_{in}$ that forces the output $V_{out}$ into the transition or linear range, is by definition, the input threshold voltage level $V_T$. In a perfectly matched circuit, the value of $V_T$ is always equal to the reference input voltage level $V_{REF}$. In a practical circuit, some small amount of mismatch must be tolerated. One component of error is due to normal differential-input offset voltages which result from slight mismatches in the transistors in the input stages. This mismatch is amplified by the amplifier as if it were an additional input voltage. Because of this slight mismatch in both the input and reference input pairs, there will be some random difference in the value of $V_T$ (for a given input and pre-amplifier) and $V_{REF}$. For a large number of circuits, the value of $V_T$ is expected to be normally distributed around a means value equal to $V_{REF}$.

The dependence of the collector supply voltage $V_{cs}$ on a negative supply can be compensated. This can be accomplished if the current sources $I_R$ and $I_i$ are matched. Variation in the value of one of the current sources due to variation in the negative supply is compensated by a similar change in the other current source. Also, variation in the inverting amplifier $A_R$ is compensated by identical changes in $A_i$.

Figure 3:
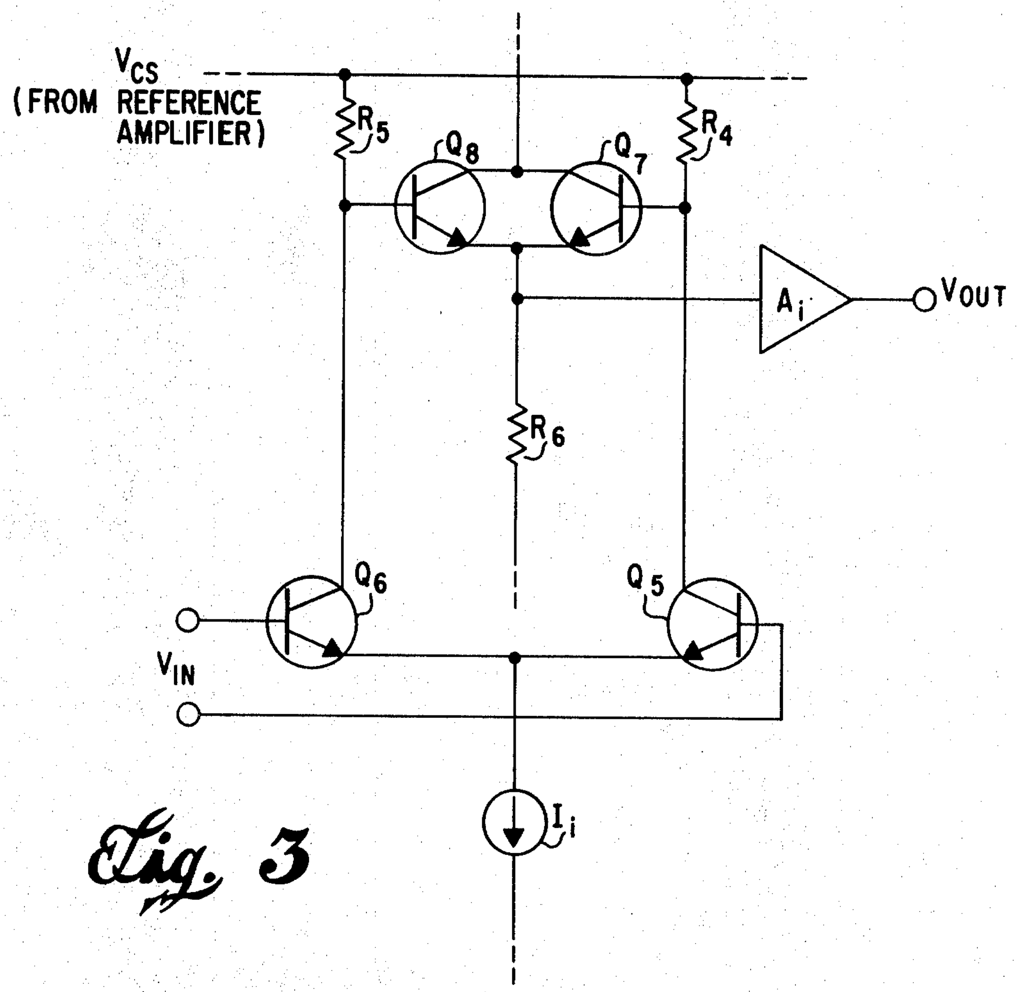
FIG. 3 is a circuit diagram of a bipolar threshold input amplifier circuit.
Figure 4:
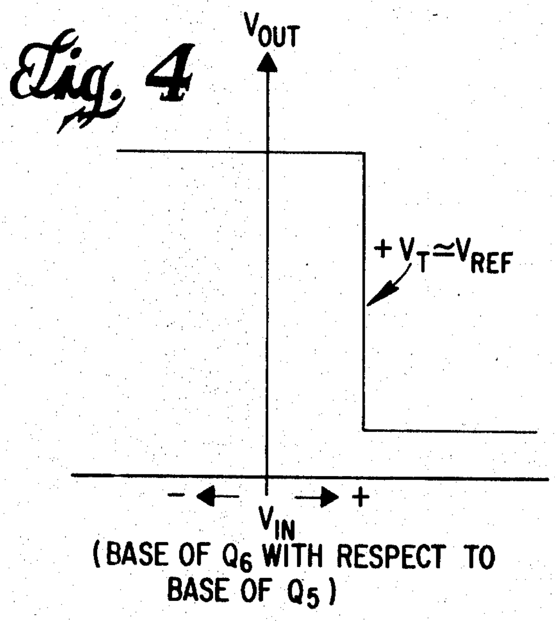
FIG. 4 is a diagram showing the unipolar threshold circuit voltage transfer function.
Figure 5:
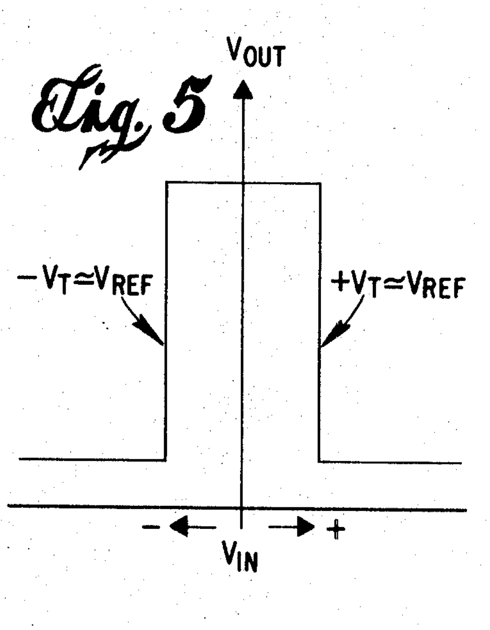
FIG. 5 is a diagram showing a bipolar threshold circuit voltage transfer function.

The above analysis is for the circuit shown in FIG. 1. In this circuit the analysis is valid for only the indicated polarity of the input voltage $V_{in}$. Input voltages of the opposite polarity will not affect the output $V_{out}$. The circuit, therefore, exhibits unipolar threshold action. For bipolar threshold action, an additional transistor, such as transistor $Q_8$, shown in FIG. 3, is used to provide threshold action to input signals of the opposite polarity. The voltage transfer function of the circuits of FIGS. 1 and 3 are shown in FIGS. 4 and 5 respectively.

The bipolar threshold input circuit is the same as the input circuit shown in FIG. 1 except for the addition of $Q_8$. In FIG. 1, the differential input amplifier, composed of $Q_5$ and $Q_6$, has an output taken only from the collector $Q_5$ which is followed by the emitter follower amplifier $Q_7$ and $R_6$. By taking an output from the collector of $Q_6$ and connecting the emitter of $Q_8$ to $Q_7$, as shown in FIG. 3, an emitter follower circuit is formed with dual inputs, that is the input from collector $Q_5$ to the base of $Q_7$ and the input from the collector of $Q_6$ to the base of $Q_8$. Thus in this matter, the threshold input amplifier will accept bipolar signals.

It should be noted that a single reference amplifier can be used to supply the collector voltage $V_{cs}$ to more than one input amplifier, thus establishing indentical input threshold levels for all the input amplifiers simultaneously. The number of input amplifiers is limited by the current available from the collector supply voltage. Component values in the inverting amplifier $A_R$ can be selected to give the desired output driving capability.

In a specific application, the sense amplifier (FIG. 6) can be used as a digital computer memory sense amplifier. In this application, the sense amplifier receives low-level input signals (generally in the range of 10 to 60 millivolts), and categorizes them on the basis of amplitude and position in time into signals represented logical "1" or "0" information stored in the memory. The output of the sense amplifier must interface with standard logic circuits in the computer arithmetic unit. The output of the sense amplifier must, therefore, have standard logic levels.

Figure 6:
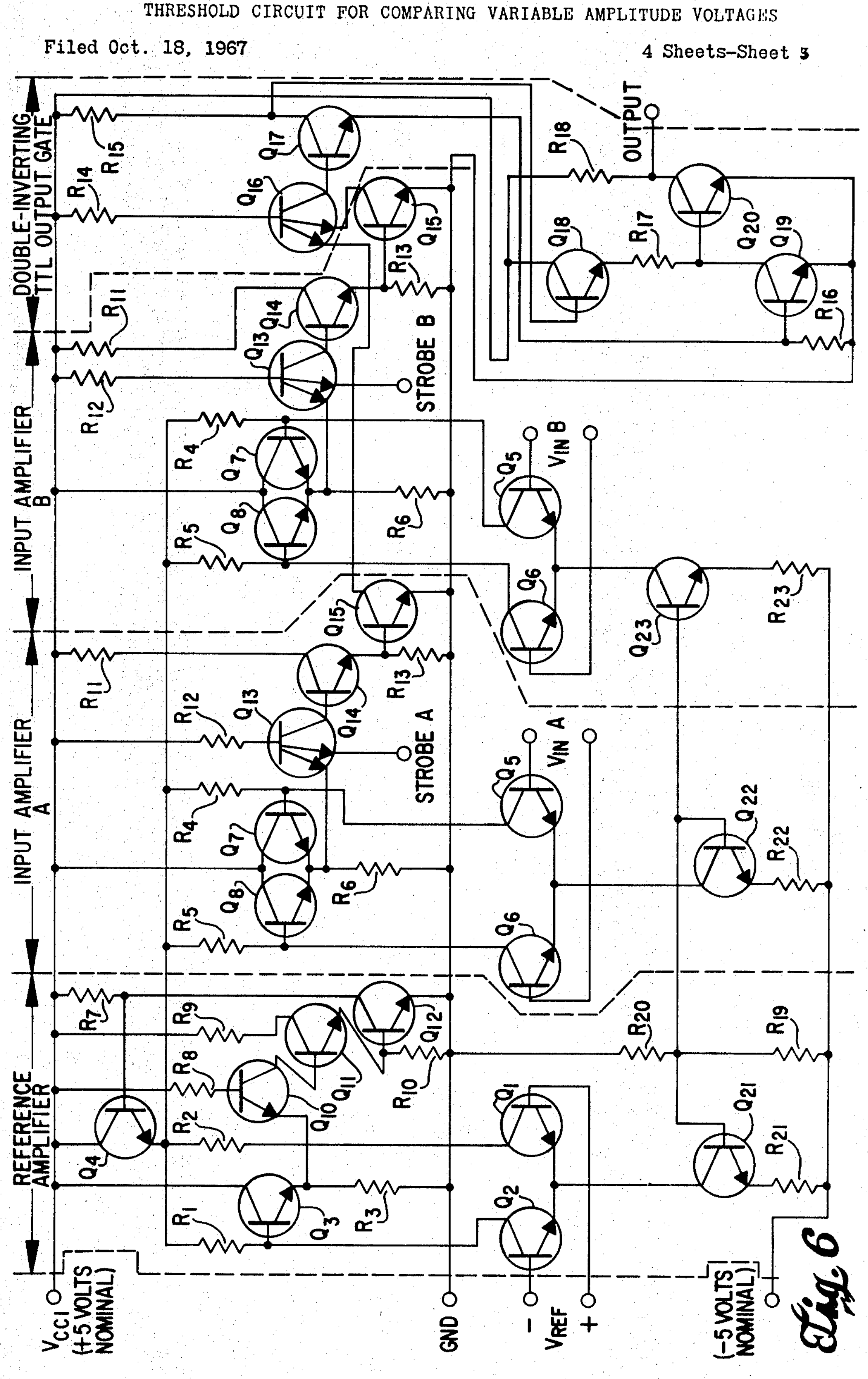
FIG. 6 is a circuit diagram of a dual input sense amplifier, using low-level threshold circuit according to the invention.

The circuit shown in FIG. 6 is a sense amplifier circuit which may be used in such an application. In this application, the inverting amplifier is implemented with a standard digital logic gate and in this case a transistor-transistor logic (TTL) gate. The components shown in FIG. 6 have the same component designations as in the circuits shown in FIGS. 1 and 3 and where the parts are duplicated, for example, in the input amplifiers A and B, component designations are used which are the same as those used in FIGS. 1 and 3.

Figure 7:
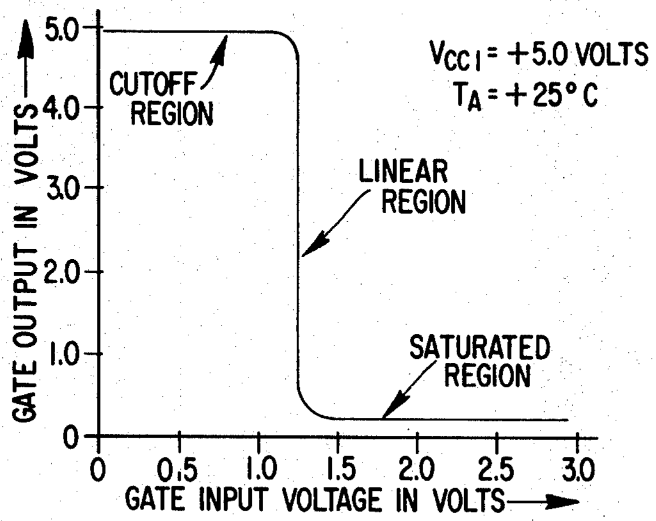
FIG. 7 is a diagram showing the voltage transfer function for an inverting amplifier.

In the reference amplifier, shown in FIG. 6, the transistors $Q_{10}$–$Q_{12}$ and the resistors $R_7$, $R_8$, $R_9$ and $R_{10}$ associated therewith correspond to amplifier $A_R$ shown in FIG. 1. The current source $I_R$ (FIG. 1) is comprised of transistor $Q_{21}$ and resistor $R_{21}$. The current sources for the two input amplifiers are comprised of transistors $Q_{22}$ and $Q_{23}$ and resistors $R_{22}$ and $R_{23}$. In the input amplifier, the amplifier designated $A_1$ in FIG. 1 is comprised of transistors $Q_{13}$–$Q_{15}$ and associated resistors $R_{11}$, $R_{12}$ and $R_{13}$. It should be noted that $Q_{13}$ is a TTL gate input transistor having two emitters, one of which is a strobe input. The double inverting TTL output gate is made up of transistors $Q_{16}$–$Q_{20}$ and resistors $R_{14}$–$R_{18}$, $Q_{16}$ being a dual emitter gate input transistor. $Q_{17}$ is a phase splitter which drives transistors $Q_{18}$ and $Q_{19}$. These two transistors work in conjunction with each other to turn the output transistor $Q_{20}$ on and off. When $Q_{20}$ is off, this represents a "1" and when it is on or conducting this condition represents a "0." The voltage transfer function of the TTL gate is shown in FIG. 7, which also shows the gate voltage gain in its linear transition region in excess of 100. This is adequate gain to satisfy the requirement for the inverting amplifier.

Figure 8:
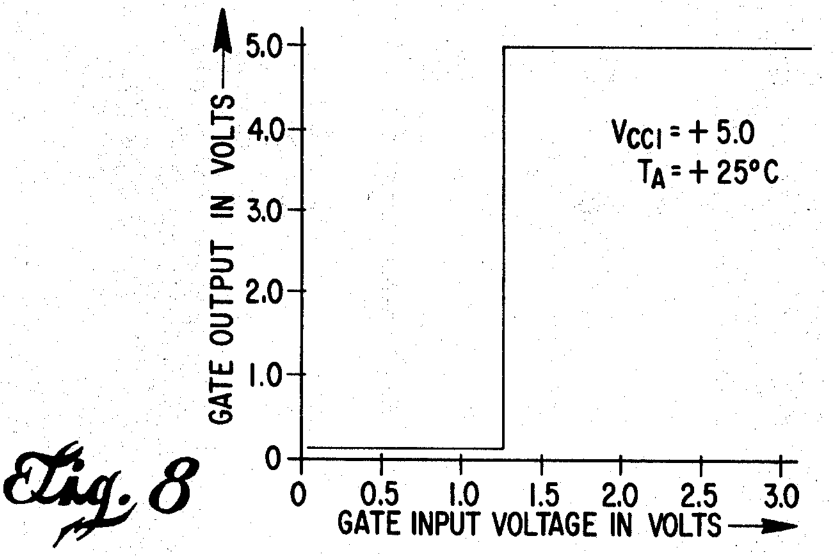
FIG. 8 is a diagram showing the voltage transfer function for a dual-input sense amplifier double inverting TTL output gate.
Figure 9:
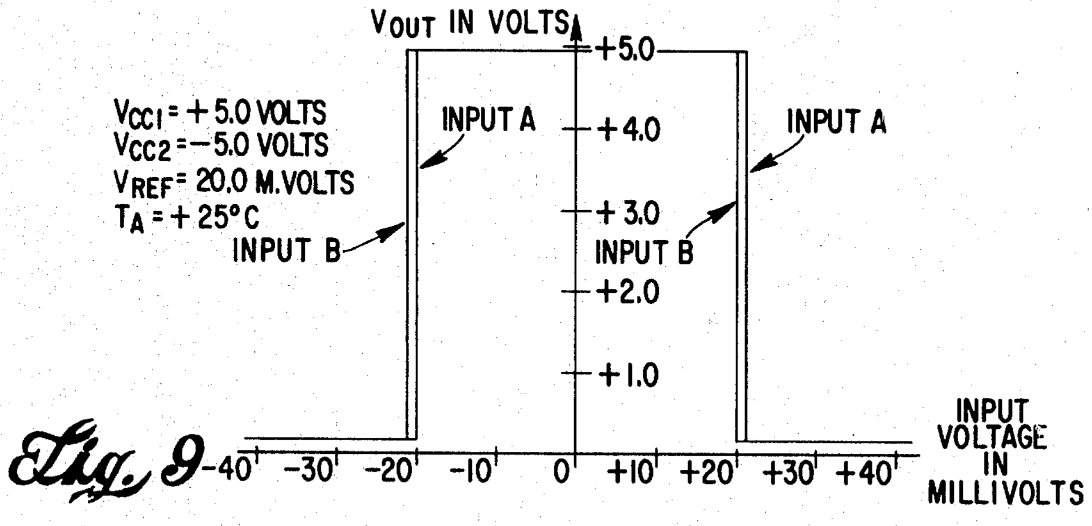
FIG. 9 is a diagram of the input-to-output voltage transfer function for a dual-input sense amplifier.

The circuit of FIG. 6 includes two input amplifiers. The outputs of the gates of these two amplifiers are combined to drive a double-inverting output gate. The voltage transfer function of this output gate is shown in FIG. 8. Operation is such that an input (to either one of the input amplifiers) that is greater than its threshold (the voltage $V_{REF}$) will switch the output. As indicated in FIG. 8, the output gate has a very high voltage gain since it is effectively two voltage gain stages. This increases the overall voltage gain from either of the inputs to the output. A voltage transfer function of the circuit of FIG. 6 is shown in FIG. 9. This is for an applied reference voltage, $V_{REF}$, of 20 millivolts and plots are included for both input amplifiers. The small errors in the threshold voltages and $V_{REF}$, are due to normal differential input offset voltages. The temperature, as indicated, is +25° C. However, plots at other temperatures from −55° C. to +125° C. (not shown) indicate that an average change in the threshold voltage of less than 0.01 millivolts per degree centigrade ($10\mu$ v./° C.) can be expected.

To obtain the additional function of time discrimination, a strobe input is added to the gates in each input channel. A logical "0," or low voltage applied at the second input emitter of the appropriate gate will prevent an input signal from switching that gate. A logical "1" or high voltage on a strobe input will enable that input amplifier. Thus the appropriate input signal can be sampled by the action of a logical "1" pulse applied to its strobe input.

The logic levels of this sense amplifier design are compatible both at the output and the strobe inputs with standard TTL digital circuits. The input threshold level can be set, by application of the appropriate reference voltage, $V_{REF}$, to any value between 10 and 60 millivolts. The lower limit is established by the stability of the applied reference voltage, the threshold temperature coefficient, and the success in matching components. The upper limit is selected to keep the reference amplifier operating in a linear mode.

The low-level threshold circuits may be built by monolithic integrated circuit techniques and does not require precision external components to establish threshold level as does previous circuits. The present circuit utilizes the inherent matching and tracking characteristics of monolithic integrated circuit components. This amplifier and similar designs may be used not only for sense amplifiers, but also in low-level comparators, sampling circuits, quantizing circuits and other applications where accurate determination of the amplitude of a low-level signal is desirable.

Although the present invention has been shown in illustrated terms of a specific preferred embodiment, it will be apparent that changes and modifications are possible without departing from the spirit or scope of the invention as defined in the appended claims.

What is claimed is:

1. A voltage comparison system for comparing an input signal with a reference signal and for producing first and second output signals respectively representing the condition when the ratio of said input signal to said reference signal is above and below a predetermined value, comprising in combination:

(a) reference amplifier means for developing a reference voltage responsive to said reference signal, said reference amplifier means comprising reference differential amplifying means, reference inverting amplifying means directly coupled to said reference differential amplifying means, and feedback means coupled between the output and input of said reference inverting amplifier means;

(b) input amplifier means for comparing said input signal with said reference voltage, and for generating said first and said second output signals, said input amplifier means comprising input differential amplifier means and input inverting amplifier means directly coupled to said input differential amplifier means; whereby (c) said first output signal is generated when the ratio of said input and reference signals are greater than a predetermined ratio, and said second output signal is generated when the ratio of said input and reference signals is less than a predetermined value.

2. The voltage comparison system of claim 1 wherein said reference differential amplifying means includes a load resistor; said feedback loop includes two semiconductor devices and said load resistor; and said reference voltage is developed across said load resistor.

3. A voltage comparison system in accordance with claim 1 wherein:

(a) said input inverting amplifier means includes ON-OFF strobe means, and generates said two output signals in response to said input signal, said reference voltage and said ON-OFF strobe means whereby;

(b) the output of said input inverting amplifier means is inhibited for all "strobe-on" conditions, and said first output signal is generated for all "strobe-off" conditions when the ratio of said input and reference signals exceeds a predetermined value, and said second output signal is generated when the ratio of said input and reference signals is less than said predetermined value.

4. A transistorized voltage comparison system for comparing an input signal with a reference signal, comprising in combination:

(a) a transistorized reference amplifier means for generating a stabilized reference voltage responsive to said reference signal comprising:
  (1) a reference differential amplifier,
  (2) a reference inverting amplifier directly coupled to said reference differential amplifier, and
  (3) a feedback loop coupled between the output and input of said reference inverting amplifier, (b) a transistorized input amplifier means for comparing said input signal with said stabilized reference voltage and for generating first and second output signals, said input amplifier comprising:
  (1) an input differential amplifier, and
  (2) an input inverting amplifier directly coupled to said input differential amplifier; wherein (c) said reference amplifier means is directly coupled to said input amplifier means so that said stabilized reference voltage provides collector supply voltage for said input differential amplifier; whereby (d) said first output signal is generated when the ratio of said input and reference signals is less than a predetermined value, and said second output signal is generated when the ratio of said input and reference signals is greater than a predetermined value.

5. A voltage comparison system for comparing an input signal with a reference signal, comprising in combination:

(a) reference amplifier means for generating a reference voltage responsive to said reference signal, said reference amplifier comprising,
  (1) a reference differential amplifier,
  (2) a reference inverting amplifier directly coupled to said reference differential amplifier, and
  (3) a feedback loop connected between the output and input of said reference inverting amplifier, (b) a first input amplifier means for comparing a first input signal with said reference voltage and for generating first and second output signals, said signals being combined with a first strobe signal in a first gate circuit, said first input amplifier means comprising:
  (1) a first differential input amplifier for combining said first input signal with said reference voltage to produce a first comparison voltage.
  (2) a first inverting amplifier for generating said first and second output signals, and
  (3) a gating circuit for combining said first and second output signals and for disabling said first inverting amplifier in the absence of said strobe signal, (c) a second input amplifier means for comparing a second input signal with said reference voltage, and for generating third and fourth output signals, said output signals being combined with a second strobe signal in a second gate circuit, said second input amplifier means comprising
  (1) a second differential input amplifier for combining said second input signal with said reference voltage to produce a second comparison voltage,
  (2) a second inverting amplifier for generating said third and fourth output signals, and
  (3) a gating circuit for combining said third and fourth output signals and for disabling said second inverting amplifier in the absence of a strobe signal; whereby (d) said first and second output signals are not generated when said first strobe is not present, said first output signal is generated when the said first strobe signal is present and the ratio of said first input signal to said reference signal is greater than a predetermined value, said second output signal is generated when said first strobe is present and said ratio is less than a predetermined value, said third and fourth output signals are not generated when said second strobe signal is present and the ratio of said second input signal and said reference signal is greater than a predetermined value, and said third output signal is generated when said second strobe signal is present and said ratio is less than a predetermined value.

References Cited

UNITED STATES PATENTS

| | | | |
|---|---|---|---|
| 3,144,564 | 8/1964 | Sikorra | 307—229 |
| 3,239,694 | 3/1966 | Rovell | 307—235 |
| 3,261,988 | 7/1966 | Johnson | 307—235X |
| 3,277,312 | 10/1966 | Harris | 307—235 |
| 3,292,098 | 12/1966 | Bensing | 330—30X |
| 3,316,423 | 4/1967 | Hull | 307—235 |
| 3,416,004 | 12/1968 | Taylor | 307—235 |
| 3,428,827 | 2/1969 | Berry | 307—235 |
| 3,449,687 | 6/1969 | Knauber et al. | 330—30 |

OTHER REFERENCES

Pub. I. "Tunnel Diode Detector" by Wilson, et al., in IBM Tech Disclosure Bulletin, vol. 9, No. 3, August 1966, p. 332.

STANLEY D. MILLER, Primary Examiner

U.S. Cl. X.R.

328—146, 150; 330—30, 69